Aug. 25, 1959  T. C. SCHUYLER  2,901,725
LINE SPLICE CLAMP
Filed Dec. 13, 1954  2 Sheets-Sheet 1
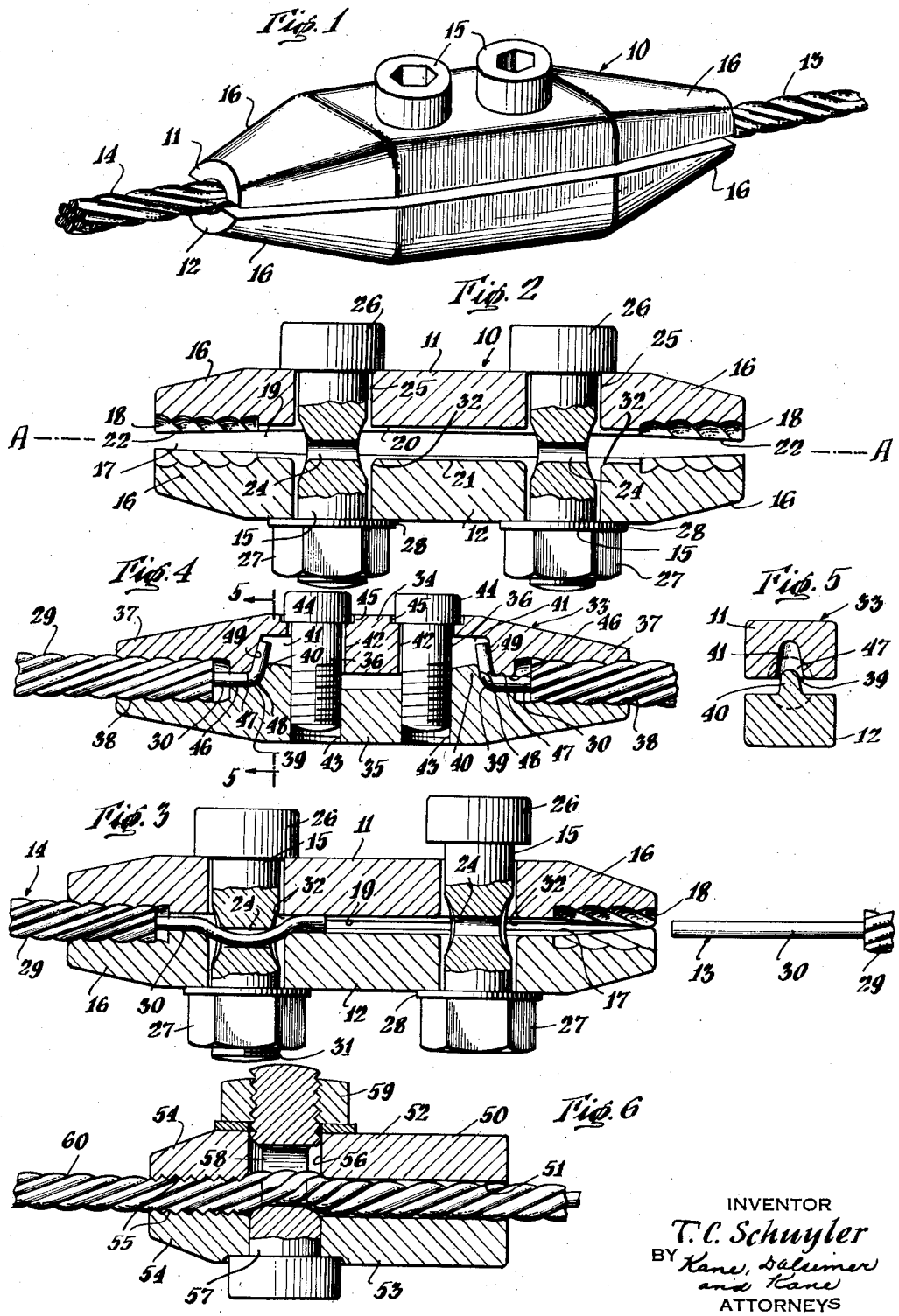
INVENTOR
T. C. Schuyler
BY Kane, Dalsimer
and Kane
ATTORNEYS

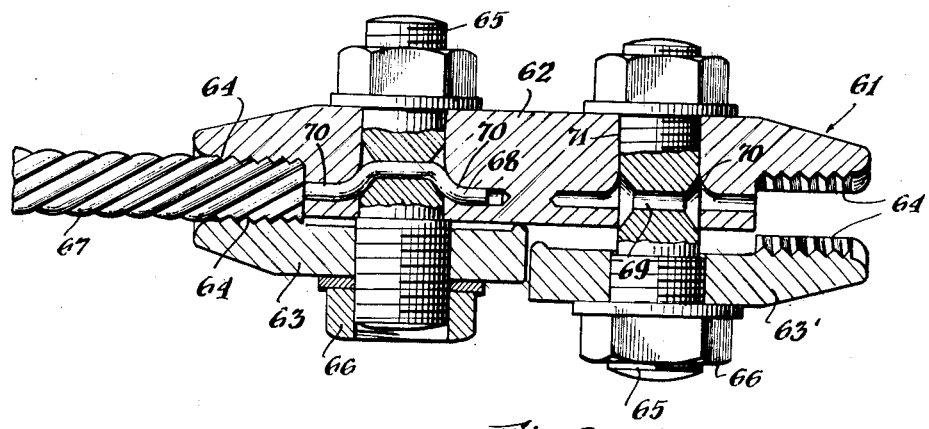
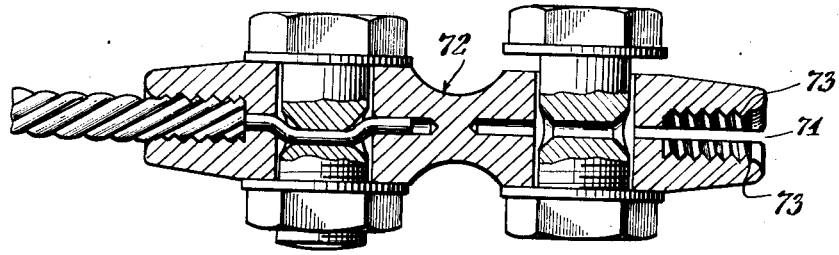
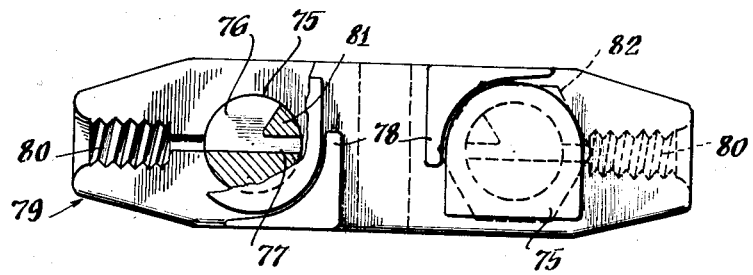

United States Patent Office 2,901,725
Patented Aug. 25, 1959

2,901,725

LINE SPLICE CLAMP

Thomas C. Schuyler, Poughkeepsie, N.Y., assignor to Fargo Mfg. Company, Inc., Poughkeepsie, N.Y., a corporation of New York Application December 13, 1954, Serial No. 474,858

2 Claims. (Cl. 339—272)

This invention relates to a line splice clamp and more particularly to a line splice clamp for steel reinforced aluminum cable.

It is an object of this invention to provide a clamp for electrical conductors which is capable of simultaneously clamping sections of the cable having different diameters to hold the cable firmly against endwise tensions.

It is another object of this invention to provide a clamp having gripping elements which grip conductors along the longitudinal axis of the conductor. Proper alignment of gripping forces with the tension or stress placed on the conductor distributes the strain throughout the strands of the conductor. Thus the strongest possible splice is effected, as no portion of the conductor is forced to carry more than its proportionate share of the work load.

It is a further object of this invention to provide a clamp for gripping conductor ends in alignment with the longitudinal axis of the conductor so that the gripping power coincides with the working stresses imposed on the gripping device with any surfaces.

It is a still further object of this invention to provide a line splice clamp having jaw portions for gripping the aluminum sheath of A.C.S.R. cable with cambered faces to distribute the gripping action imposed upon the jaws by the closing means thereof.

Additional objects are those of providing a clamp for a reinforced aluminum cable which will hold the latter firmly against end-wise movement, which clamps a bare steel core of the cable and crimps the same to hold it against length-wise shifting, and to also provide a construction in which jaws or clamping surfaces not alone engage and retain the aluminum sheath, but also similarly cooperate with the steel core.

These and other objects of this invention will become more apparent upon consideration and when taken together with the accompanying drawings in which:

Fig. 1 shows a perspective view of a line splice clamp according to this invention;

Fig. 2 is a vertical, longitudinal, sectional view of a line splice clamp according to this invention;

Fig. 3 is a vertical, longitudinal, sectional view of the line splice clamp of Fig. 2 in association with two pieces of steel reinforced aluminum cable;

Fig. 4 is a vertical, longitudinal, sectional view of a modified form of the line splice clamp of this invention;

Fig. 5 is a vertical, transverse, sectional view of the line splice clamp of Fig. 4 taken on line 5—5 of Fig. 4 in the direction of the arrows;

Fig. 6 is a vertical, longitudinal sectional view of a dead-end embodying the teachings of this invention;

Fig. 7 is a vertical, longitudinal sectional view of a further form of this invention;

Fig. 8 is a similar view of a still further form of this invention; and

Fig. 9 is a top plan view, partly broken away, of another form of this invention.

In general this invention provides a clamp for holding conductors having different diameters. In the clamp one pair of jaws are provided for clamping one diameter of the conductor and means are also provided within the clamp for clamping another diameter of the same conductor so that the conductor is held against axial, longitudinal or lengthwise forces by a closing action of both of the clamping means. The closing of the clamping means according to this invention is effected by a single means and in one closing operation.

In Fig. 1 a line splice clamp 10 according to this invention is shown made up of a member 11 which forms an upper half of the clamp and a member 12 which forms a lower half of the clamp 10. The clamp 10 is shown receiving at each of its respective ends, sections 13 and 14 of an A.C.S.R. cable. The members 11 and 12 are held together by bolts 15 which pass transversely through the clamp 10. The members are provided at each end with jaw portions 16 which cooperate with each other to form a means for clamping the respective cable sections 13 and 14.

Fig. 2 shows a bore 17 which extends through the clamp 10 from jaws 16 at one end to jaws 16 at the other end. The clamp 10 is symmetrical at the two ends around a center line indicated by the line A—A in Fig. 2. The jaws 16 are provided with internal spiral serrations 18. These serrations 18 are preferably tapped threads. The bore 17 has a passage section 19 inwardly of the jaw portions 16. The passage section 19 is made up of complementary channels 20 and 21 formed in the members 11 and 12, respectively. Channel 20 extends longitudinally along the center line of member 11 and channel 21 extends longitudinally along the center line of member 12. When the two members 11 and 12 are drawn together by the bolts 15, the channels 20 and 21 form the passage section 19 just as the complementary serrations 18 form the conductor gripping portions of the jaws 16.

Each jaw 16 has a face 22 which is slightly cambered and inclined, as shown in Fig. 2, to diminish the diameter of bore 17 at its outer ends. The purpose of this shape of the faces 22 is the distribution of the gripping action imposed on the jaws.

The bolts 15 are each provided with an eye 24 which is axial to the bore 17 and to the passage section 19 when the clamp 10 is in open position. The bore 17 of which the passage section 19 is a part extends the entire length of the clamp 10 so that a conductor inserted into the clamp 10 in its open position can pass unobstructedly through the bore 17 and the eyes 24 of the bolts 15. Aligned pairs of vertically extending openings 25 are formed adjacent to the jaw portions 16 through both members 11 and 12. These receive the shanks of the bolts. As shown, the bolt heads 26 abut against the outer surface of the upper member 11 and hexagonal nuts 27 are fastened to the lower ends of the bolts 15 abutting against washers 28 and in position so that they may be tightened against the undersurface of the lower member 12. The bolts 15 thus extend downward through the clamp 10 as shown in Fig. 2 and hold the two members 11 and 12 together by the action of the bolt heads 26 and the hexagonal nuts 27 against the upper member 11 and the lower member 12, respectively. The eye 24 is formed in each bolt 15 radially thereof so that the eye 24 is perpendicular to the axis of its respective bolt 15.

In Fig. 2 the eyes 24 shown therein are slightly off center from the axis of the bore 17. This is the position of the bolts 15 and eyes 24 when the clamp 10 is in a closed or partially closed position, gripping a conductor or conductor section.

Referring to Fig. 3, the right end of the clamp 10 is in unclamped position for reception of section 13 of an A.C.S.R. cable. In this position the right bolt 15 is loosened and its eye 24 is in alignment with the bore 17 and the passage section 19 and the axis of the serrations 18. The left end of clamp 10 in Fig. 3 shows the bolt 15 in tightened or clamping position and the jaws 16 at the left end in clamping position clamped on the section 14 of the cable. The cable sections 13 and 14 are made up of A.C.S.R. cable and have a sheath of aluminum strands 29 surrounding a hard steel core 30. As shown in Fig. 3 at the left end of clamp 10, the sheath of aluminum strands 29 is held in the tapped thread serrations 18 of the jaws 16. A bare section of the hard steel core 30 extends from the serrated portion of the jaws 16 into passage section 19 and through eye 24 of the respective bolt 15. The steel core of the section 14 extends through the eye 24, and into the passage section 19 on the interior side of the bolt 15.

In this position, the bolt 15 clamps the jaws 16 in a cable gripping closed position so that the sheath of aluminum strands 29 is gripped in the serrations 18. In the closed position of the bolt 15, the eye 24 is out of axial alignment with the bore 17, the passage section 19 and the axis of the jaws 16. The steel core 30 thus passing through the eye 24 is clamped by the crimping action of the eye 24 in moving out of alignment with the adjacent portions of the passage section 19. This crimping action is effected by tightening of the nut 27 on the bolt 15 which draws the bolt downward, as shown in Fig. 3, from the position of the bolt 15 as represented at the right end of the clamp 10 to the position of the bolt 15 as represented at the left end of the clamp 10. The necessary force for crimping the hard core 30 is provided by the mechanical action of screwing the nut 27 on to threads 31 of the bolt. This same threading of the nut 27 on the bolt 15 causes a drawing together of the members 11 and 12, closing of the complementary jaws 16 and gripping of the aluminum strands 29 of the cable section 14 in the serrations 18 and applying the camber of the jaw faces 22 to distribute the closing force and the gripping of the jaws 16.

In the operation of clamp 10 of Figs. 2 and 3, according to this invention, the bolts 15 of the clamp 10 are loosened to allow some play between the upper member 11 and the lower member 12. With the members 11 and 12 of the clamp 10 loosely separated, as shown in Fig. 2, the sections 13 and 14 of the cable may be inserted between the jaws 16 by end-wise axial motion, as indicated by cable section 13 at the right end of Fig. 3. For this operation, the eye 24 of the respective bolt 15 is moved into axial alignment with the jaws 16 and the bore 17. With the eye 24 thus lined up, the bare section of the steel core 30 is slid easily into the passage 19 and through the eye 24 out the other side to the continuation of the passage 19 in the central part of the clamp 10. Thus positioned, the bare section of the steel core 30 extends completely through the bolt 15 and perpendicularly to the axis thereof. The sheath of aluminum strands 29 of the cable is positioned within the jaws 16 so that the tapped thread serrations 18 register with the spiral strands of the cable.

With the steel core 30 thus extending through the bolt 15, a disalignment of the eye 24 by tightening nut 27 clamps the core as shown with cable section 14 at the left end of Fig. 3. With this clamping action and closure of the jaws 16, the bolt 15 moves axially of the hard steel core 30 inserted through its eye 24. The core 30 is flexed by the motion of the bolt 15 to become crimped with a deformation that adapts the core 30 to its new path from the passage 19, through the eye 24 to the continuation of the passage 19. Thus crimped, the core 30 bends over the edges of the bolt hole 25 at surfaces 32 adjacent the juncture of passage 19 and a bolt hole 25. The crimped core 30 also is in contact with the edges of the eye 24. As shown in the left end of Fig. 3, the core 30 of the cable section 14 is in tight contact with four edges as the result of the tightening of the bolt 15. The core 30 and the cable section 14 is consequently held tightly against lengthwise motion by this contact with the edges of the passage 19 and the eye 24. The parts of the clamp 10 are so arranged that this gripping of the bare section of steel core 30 is achieved without severe clamping of the jaws 16 on the sheath of aluminum strands 29.

In Fig. 4 a modification of this invention is shown in which the cable sections 13 and 14 are held in a clamp 33 to secure the cable against end-wise or axial movement with the major part of the strain taken up by the hard steel core 30. In the modified clamp 33 an upper member 34 and a lower member 35 are held together by bolts 36. The clamp 33 has jaws 37 at each end thereof and the jaws have internal serrations 38 such as described above in connection with the form shown in Figs. 2 and 3. Adjacent the serrations 38 at each end, the clamp 33 is provided with a pair of bending jaws 39. The bending jaws 39 are made up of an anvil 40 formed in the lower member 35 and a recess 41 in the upper member 34. As shown by the transverse sectional view of Fig. 5, the anvil 40 fits into the recess 41 when the upper and lower members 34 and 35 are brought together. The upper member 34 and the lower member 35 are each provided with pairs of bolt holes 42 and 43, respectively. The bolt holes 42 of the upper member are aligned with the bolt holes 43 of the lower member to provide for the reception of the bolts 36 which draw the members 34 and 35 together and hold them in a clamping relationship. The bolts 36 are threaded and the bolt holes 43 in the lower member are provided with female threads for receiving the threaded bolts 36. The members 34 and 35 are drawn together by screwing the bolts 36 into the holes 43 so that heads 44 of the bolts will bear against the surfaces of recesses 45 to draw members 34 and 35 together.

The clamp 33 is provided with a passage 46 which extends centrally inwardly of the clamp 33 from each of the jaws 37 towards the center of the clamp. Each of the passages 46 has an L-shaped bend in an upward direction, as shown in Fig. 4. This passage extends between the anvil 40 of the lower member and a shaping knee 47 of the upper member. Each passage extends into the recess 41 at its respective end of the clamp 33. As shown in Fig. 4 the bare ends of the core 30 of the cable sections 13 and 14 extend through their respective passages 46 into the adjacent recesses 41. These ends are secured between the knees 47 and the anvils 40 while the sheath of aluminum strands 29 of the cable sections 13 and 14 are grasped in the grooved serrations 38 of the jaws 37.

In the operation of the modification of Fig. 4 the clamp 33 receives sections 13 and 14 of the cable. The end of each of these sections has a bare section of the hard steel core 30 extending from the sheath of aluminum strands 29. The ends of the sections are inserted between the jaws 37 and each bare steel core 30 is positioned in the passage 46 between the anvil 40 and the knee 47 while each aluminum sheath is positioned in the jaws 37 at its respective end of the clamp 33. The upper and lower members 34 and 35 of the clamp 33 are separated during the insertion of the sections 13 and 14 of the cable so that the anvil 40 and the knee 47 are separate and each bare section of the hard steel core 30 extends axially into its widened passage 46 and into its respective recess 41. The clamp 33 is then closed by threading the bolts 36 into the threaded bolt holes 43 to draw the upper member 34 and the lower member 35 together. This causes each anvil 40, to enter its adjacent recess 41 as shown in Fig. 4. Accordingly, each passage 46 is constricted by the approaching anvil 40 and knee 47 so that the bare portion of the hard steel core 30 is bent and crimped by the relative motion. The anvil 40 has a surface 48 which is complementary to a surface 49 defining the knee. As the anvil 40 and the knee 47 at each end of the clamp 33 move towards each other, the surfaces 48 and 49 move across each other with a wiping motion. This relative motion between the surfaces 48 and 49 acts upon the hard steel core 30 positioned in the passages 46 to exert a powerful bending force which displaces the core ends angularly. In this way the hard steel core 30 is clamped in the clamp 33 and retained in the closed passages 46 to resist lengthwise or axial force on the cable.

Another modification of this invention is shown in Fig. 6. This form can be applied for holding the end of a cable, such as in a "dead end." In such use of this invention only one cable end is held, as shown in Fig. 6. Also, it is not essential in the broad aspect of this invention to crimp or bend the bare end or bare section of the hard steel core of the A.C.S.R. In this view a dead end 50 is shown having a passage 51 extending axially therethrough. The dead end 50 is made up of an upper member 52 and a lower member 53. The axial passage 51 is formed by a pair of matching grooves formed in the respective members 52 and 53. The dead end 50 is provided at the left end, as shown in Fig. 6, with jaws 54. The jaws 54 are provided with teeth 55 along the section of the passage 51 passing through the jaws 54. The members 52 and 53 are provided with a bolt passage 56 which extends vertically through the dead end 50 perpendicular to its axis. A bolt 57 fits through the bolt passage 56 and protrudes through the bolt passage 56. An eye 58 is provided in the bolt 57 and a threaded portion is provided on bolt 57 for receiving a nut 59. A section 60 of cable, such as A.C.S.R. cable, extends through the passage 51 and the eye 58. The eye 58 is axially alignable with the passage 56 similar to the arrangement described above in connection with clamp 10 shown in Figs. 2 and 3. The eye 58 may be moved out of alignment by closing the dead end 50 and drawing the bolt 57 through the passage 56 by means of the nut 59.

As the dead end 50 is closed, the clamping action of the jaws 54 upon the closing together of the members 52 and 53 causes the teeth 55 to grasp the cable section 60. As the closing of the dead end 50 continues, the disalignment of the eye 58 causes a deformation of the section of the cable 60 passing through the eye. This bending presses the cable section 60 against the edges of the bolt passage 56 adjacent the axial passage 51 and tightly binds the cable 60. Thus the cable 60 is tightly held against lengthwise or axial movement and gripped in the dead end 50. The main gripping action of the cable 60 is achieved by the crimping of the hard steel core within the cable and auxiliary gripping of that cable is, of course, achieved by engagement of the teeth 55 with the outer strands.

Other modifications of this invention may be made without departing from the spirit thereof. The above described embodiments are presented for the purpose of illustrating the invention. The clamping device of this invention is intended for the purpose of holding cable ends of different diameters so that they may be spliced and held by an improved gripping pressure. This invention is not confined in its application to gripping and holding stranded cables. It may be applied to splicing, by the same action, solid conductors with ends of equal diameters or dissimilar diameters. The purpose of this invention is to provide a clamping device in which members are brought together by bolt action to seize the cable and in the seizing of the cable clamp conductors of dissimilar diameters to hold the conductors against lengthwise or axial movement. In this way, this device provides a means for holding A.C.S.R. cable mainly by gripping or clamping the hard steel core and only to a lesser degree by gripping the softer sheaths of aluminum strands.

It is apparent that the members providing the assemblies need not embrace a single action. Also, the eyes within the bolts may include various outlines best calculated to cause a ready crimping of the cable core.

In another modification of this invention shown in Fig. 7 a clamp 61 has an upper body 62 and a lower body divided into two sections 63 and 63'. Each of the lower body sections 63 and 63' forms with its respective end of the upper body 62 a pair of jaws 64 for gripping the aluminum sheath of an A.C.S.R. cable. The clamp 61 is provided with a pair of bolts 65 and cooperating nuts 66 fitted in the clamp 61 in the manner of bolts 15 and nuts 27 of clamp 10 described above in Figs. 1, 2 and 3. An A.C.S.R. cable 67 is shown fitted in the left end of the clamp 61 and has a bare portion 68 extending through an eye 69 of its respective bolt 65. The clamp 61 includes passages 70 which merge with the holes 71 in the upper body 62. These passages receive the bare portions 68 of the wire.

As seen at the left of Fig. 7 the bare portion 68 extending through to the inner end of the passage 70 is deformed axially by the displacement of bolt 65 in clamping the jaws 64 on the aluminum sheath of the cable 67. This modification eliminates the tendency and possibility of the displacement of the strands of the sheath by the clamping action of the jaws of the form shown in Figs. 1, 2 and 3. This displacement may take the form of spreading of the strands or splaying out.

A further modification is shown in Fig. 8. The clamp 72 is of one piece with jaws 73 separated by end slots 74 so as to grip a cable on closure by a bolt in the manner described above in connection with other forms of this invention. This modification eliminates the disalignment of clamp parts.

A still further modification is shown in Fig. 9 in which there is shown a top plan view of another clamp 79. This shows that the bolts 75 of this form of the invention are not pierced by an eye perpendicular to the axis. Instead each bolt 75 is formed at the portion adjacent the jaws 80 with cut-out portion 76 and a passage 77. Adjacent each bolt is a shoulder 78 formed in the clamp 79. To grip the cable in the clamp 79 the bare portion is inserted through the passage 77 so that it abuts the inner surface of the hole for bolt 75 in clamp 79. Referring to the left end of the clamp 79, the counter-clockwise rotation of the bolt 75 will cause the bare wire end to bend over the anvil 81 formed by the passage 77 and the cut-out portion 76. Tightening the nuts 82 closes the jaws on the aluminum sheath, and in addition compresses the hook formed when the bare wire end is bent over the anvil 81. This further locks the hook against any releasing tendency due to excessive axial tension on the cable when in service.

This invention provides a joint for dual construction wire such as A.C.S.R. electrical conductors by grasping the tough hard and strong center strand with a tight grip and at the same time grasping the outer layer of more malleable conducting wire strand with a secure but less compressive grip. In this way this invention distributes the gripping pressure on the end of the cable and applies only that pressure to the softer outer strands as can be withstood without undue deformation. It is an advantage of this invention that the pressure on the inner tougher strand and the pressure on the outer softer strand can be proportioned according to the properties of these various strands for withstanding gripping pressure. The advantage of such proportioning is the accomplishment of a maximum overall gripping strength on the cable and consequently a maximum overall strength of the splice or the dead end grip. This invention is equally applicable to dead end gripping, to cable splicing and to other gripping actions on cables having dissimilar diameters in their composition.

A further advantage of this invention is found in the accomplishment of a satisfactory grip by hand wrench tightening. Further on releasing the grip of the clamp of this invention, the clamp may be removed from the conductor and may be easily and simply used again. A further advantage of this invention is provided in the camber shape of the gripping faces of the clamping jaws in one form of the invention. However, the camber shaping is not a principal feature of the device.

Still another advantage of this invention is found in the fact that at no time is it necessary to remove the nuts and bolts from the clamp, whether the clamp is in use or not.

This invention provides a means for gripping the ends of a dual type cable construction with two separate and different kinds of gripping action, each suited to best grip one of the elements of the cable. This gripping provides a tight hold on the tough cable supporting core member of the construction to hold the cable against the stresses of pull and push of the cable on the line splice and the grip which it provides. The device of this invention serves to hold the cable from longitudinal displacement and keeps it in true longitudinal alignment.

As mentioned above, it will be readily apparent that various modifications of the device described in the above description may be made without a departure from the spirit of this invention. Accordingly, it is intended that this invention be limited only by the scope of the appended clams.

I claim:

1. A line splice clamp comprising a pair of separable members, bolts for drawing said separable members together, an axial passage formed by recesses in said members extending through said clamp from one end to the other, transverse passages through said clamp at an angle to said axial passage, each for receiving one of said bolts, an eye in each of said bolts positionable axially to said clamp so as to form a part of said axial passage, jaw portions formed at each end of said clamp for receiving large diameter sections of conductors and nuts threadable on said bolts for closing said separable members together and moving said eyes transversely to said axial passage whereby a section of a conductor positioned in an eye of a bolt will be crimped by a movement contemporaneous with said closing of said separable members.

2. In combination a pair of relatively movable members, jaws extending from said members and each formed with axially extending recess providing, in aggregate, a cable-receiving bore, cable-gripping surfaces extending outwardly from the face of each of said recesses, body portions extending rearwardly of said jaws and providing in conjunction therewith a line-clamp assembly, said assembly being formed with a transverse opening intersecting said members, jaw-tightening means forming a part of said assembly and extending through said opening for drawing said jaws towards each other, a cable comprising an outer layer of strands and a central core, said cable lying within the recesses of said jaws, at least said core extending beyond the same in a direction rearwardly away from said jaws and surfaces forming a part of said jaws and tightening means and directly engaging with said cable to displace at least the core of the latter out of alignment with the axis of said cable as said jaw-tightening means is operated.

References Cited in the file of this patent

UNITED STATES PATENTS

| | | |
|---|---|---|
| 789,994 | Myers | May 16, 1905 |
| 1,454,359 | Werenskiold | May 8, 1923 |
| 2,177,364 | Fotsch | Oct. 24, 1939 |
| 2,348,100 | Wadsworth | May 2, 1944 |
| 2,426,859 | Case | Sept. 2, 1947 |
| 2,482,901 | Cianfrone | Sept. 27, 1949 |